US009361151B2

(12) United States Patent
Gamer et al.

(10) Patent No.: US 9,361,151 B2
(45) Date of Patent: Jun. 7, 2016

(54) CONTROLLER SYSTEM WITH PEER-TO-PEER REDUNDANCY, AND METHOD TO OPERATE THE SYSTEM

(71) Applicant: ABB Technology AG, Zurich (CH)

(72) Inventors: Thomas Gamer, Bruhl (DE); Stephan Sehestedt, Mannheim (DE)

(73) Assignee: ABB TECHNOLOGY AG, Zurich (CH)

( * ) Notice: Subject to any disclaimer, the term of this patent is extended or adjusted under 35 U.S.C. 154(b) by 0 days.

(21) Appl. No.: 14/682,519

(22) Filed: Apr. 9, 2015

(65) Prior Publication Data

US 2015/0293779 A1    Oct. 15, 2015

(30) Foreign Application Priority Data

Apr. 9, 2014    (EP) ..................................... 14001298

(51) Int. Cl.
G06F 9/46    (2006.01)
G06F 9/48    (2006.01)
G06F 11/20    (2006.01)

(52) U.S. Cl.
CPC .............. *G06F 9/461* (2013.01); *G06F 9/4881* (2013.01); *G06F 11/2033* (2013.01)

(58) Field of Classification Search
CPC ....................................................... G06F 9/461
USPC ....................................................... 718/1–108
See application file for complete search history.

(56) References Cited

U.S. PATENT DOCUMENTS 5,487,149 A *    1/1996    Sung .................... G06F 11/2005
                                                       714/10
5,644,755 A *    7/1997    Wooten ............... G06F 9/45533
                                                       703/23

2003/0097610 A1 *    5/2003    Hofner ................. G06F 11/2038
                                                            714/10
2004/0001431 A1    1/2004    Rostron
2005/0081110 A1    4/2005    Rostron
2011/0246815 A1 *    10/2011    Peterson ............. G06F 11/0709
                                                            714/4.11
2012/0151550 A1 *    6/2012    Zhang ....................... H04L 1/22
                                                            725/148

FOREIGN PATENT DOCUMENTS

EP    2 458 768 A1    5/2012

OTHER PUBLICATIONS

Siciliano, Bruno, and Jean-Jacques E. Slotine. "A general framework for managing multiple tasks in highly redundant robotic systems." Advanced Robotics, 1991.'Robots in Unstructured Environments', 91 ICAR., Fifth International Conference on. IEEE, 1991. pp. 1211-1216.*
Kanoun, Oussama, et al. "Prioritizing linear equality and inequality systems: application to local motion planning for redundant robots." Robotics and Automation, 2009. ICRA'09. IEEE International Conference on. IEEE, 2009. pp. 2939-2944.*
Mansard, Nicolas, and Francois Chaumette. "Task sequencing for high-level sensor-based control." Robotics, IEEE Transactions on 23.1 (2007): pp. 60-72.*
*European Search Report dated Sep. 29, 2014.

* cited by examiner

*Primary Examiner* — Satish Rampuria
(74) *Attorney, Agent, or Firm* — Buchanan Ingersoll & Rooney PC

(57) ABSTRACT

Exemplary controllers in a system are associated with technical entities and are configured to selectively execute tasks in a primary mode when the controllers interact with the associated technical entities with respect to the tasks, and to execute tasks in a secondary mode when the controllers do not interact with the associated technical entities with respect to the task. The system distributes task instructions of a first task to a first controller that is configured to execute the first task in the primary mode, and to distribute the task instructions of the first task to a second controller that is configured to execute the first task in the secondary mode. The system distributes task instructions of a second task to the second controller that is configured to execute the second task in the primary mode.

14 Claims, 5 Drawing Sheets

CONTROLLER SYSTEM WITH PEER-TO-PEER REDUNDANCY, AND METHOD TO OPERATE THE SYSTEM

RELATED APPLICATION(S)

This application claims priority under 35 U.S.C. §119 to European application 14001298.0 filed on Apr. 9, 2014, the entire content of which is hereby incorporated by reference.

FIELD

The present disclosure relates to computer systems, and in particular to control systems that execute tasks in a redundancy scheme.

BACKGROUND INFORMATION

Technical systems, such as power plants, energy distribution networks, manufacturing equipment in industry, transportation facilities, electric vehicle charging networks, or the like have a number of constraints. To name only a few, the systems need to be highly available, the systems can be complex with a number of inter-related components, and some of the systems operate in an automatic or semi-automatic operation mode.

To address these and other constraints, technical components capable of influencing technical process execution can be provided with redundancy, and the technical systems can be connected to control systems. The control systems include computers at substantially all levels. Computers can assist to control the technical system as a whole, for example, computers in control centers, control systems, or automation systems. Computers can be associated with individual components that implement an industrial process or with elements of the components.

In an industrial environment, the computers can be implemented as controllers with a central processing unit (CPU), communication module, and power supply module. An example for a controller is the controller that is commercially available from ABB Automation GmbH, Mannheim, Germany under the trademark "AC 800M".

Using redundancy for the computers and for controllers is common. Popular redundancy approaches include warm standby (or hot standby) and N-modular redundancy. Usually, the redundancy schemes can be selected according to the desired overall availability of the system.

Much simplified, with hot or warm standby, a stand-by controller substantially provides identical function as the controller in operation or active controller, and if the controller in operation fails, the standby controllers take over (one-to-one). Until the controller in operation is being replaced, the system is no longer tolerant to faults.

Controllers in an N-modular arrangement can be substantially operative all the time according to substantially identical programs. Their output is compared in a voting scheme with implicit error detection so that the output of a malfunctioning controller is disregarded. An example for an N-modular arrangement is the arrangement 2-out-of-3 (2oo3, or "Triple Modular Redundancy").

However, any redundancy calls for technical resources, such as the provision and operation of additional controllers. This leads to additional power consumption and maintenance efforts, computing overhead (for the voting scheme) and the like. The demand for technical resources increases with the desired overall availability. This conflict should be addressed.

In a control system and a controller system respectively with three or more controllers, the controllers can be associated with technical entities. The controllers execute tasks individually and separately, but some controllers share task instructions as peers. With respect to an exemplary first task, the instructions can be distributed to a first controller that executes the first task in interaction with the associated technical entities, in the so-called primary mode. The instructions can be distributed to a second controller that provides redundancy for the first task. Thereby, the second controller does not interact with the associated technical entities, in the so-called secondary mode. Regarding an exemplary second task, the instructions can be distributed to a third controller that executes the second task—in the primary mode—and to the first controller that provides redundancy for the second task.

In other words, the first controller can have the second controller as a task execution peer, and the first controller is the redundancy peer to the third controller. If one of the controllers becomes non-available, the peer-to-peer relation changes.

For example, if the first controller becomes non-available, the second controller takes over the first task. To regain redundancy for the third task, the second controller becomes the redundancy controller for the third task.

Non-availability can occur at several degrees of severity: Non-availability can include total non-availability in that a controller cannot execute any task at all. Non-availability can also include partial non-availability in that the controller can execute at least some tasks, or can execute the tasks with reduced speed or bandwidth.

Exemplary embodiments of the present disclosure allow the distribution of non-availability risks over multiple controllers. To save resources, the tasks are not executed by two or more controllers in parallel (as in an N-redundancy scheme or in hot standby). The approach takes advantage of the technical features of modern controllers, such as sufficient capacity (memory and processor) to execute multiple tasks at the same time.

A controller spends electrical energy corresponding to the number of tasks, so that a controller for two or more tasks temporarily can have increased energy spending as compared to a single-task controller, but energy spending will balance out as soon a replacement controller starts operation.

Modern controllers usually have sufficient capacity to execute multiple tasks, or to temporality execute additional tasks. The controllers may be equipped with additional hardware (for example, memory), but extra costs can be negligible so that costs could be saved in comparison to having a dedicated controller to act as secondary controller. In other words, free capacity of controllers is used when the controller executes tasks as a secondary controller, provided that the task execution as a secondary controller does not interfere with the normal task execution as primary controller. In contrast to deployments known in the art, additional controllers for redundancy provisioning are not specified.

Non-availability of a controller can have a variety of reasons, such as a failure or defect in the controller hardware (memory, processor, bus, storage etc.) or even in the controller software.

In principle, the approach is not sensitive to non-availability. The approach can also be applied for maintenance of the controllers. Maintenance can be hardware maintenance or software maintenance. The service person who is in charge to maintain the controllers, can simply switch off a controller, and a different controller takes over operation. The maintenance of a single controller does not interrupt the operation of the controller system as a whole, non-interrupted maintenance can be achieved. A number of different tasks can be distributed for execution across several controllers in the primary and secondary modes for the tasks. A controller becoming inactive (e.g., non-available) triggers the controllers in the secondary mode to take over the execution of tasks in the primary mode. This operation can be useful for implementations with multiple rail-mounted controllers, in that controllers can be replaced.

The execution of the task can be moved back to the original controller (that executed the task first) when it is available again or if a replacement controller has been installed. Moving back can be accomplished with synchronization.

Controllers that execute tasks assume certain states with respect to data being processed, variables or registers being set. State information can be preserved and communicated between the controllers, for example, as checkpoints or data signals.

SUMMARY

An exemplary controller system is disclosed, comprising: a plurality of controllers each being associated with technical entities, each controller is configured to selectively execute a task in a primary mode when the controller interacts with the associated technical entity with respect to the task, and to execute the task in a secondary mode when the controller does not interact with the associated technical entity with respect to the task, wherein task instructions of a first task are distributed to a first controller configured to execute the first task in the primary mode, and to distribute the task instructions of the first task to a second controller that is configured to execute the first task in the secondary mode, wherein task instructions of a second task are distributed to the second controller that is configured to execute the second task in the primary mode, and wherein the system is configured, upon non-availability of the first controller, to switch the second controller from the secondary mode for the first task to the primary mode for the first task, while the second controller is adapted to continue executing the second task in the primary mode.

An exemplary non-transitory computer readable medium for executing a method of operating a controller system is disclosed, the controlling system having a plurality of controllers that are associated with technical entities and that are adapted to selectively execute tasks in a primary mode when the controllers interact with the associated technical entities with respect to the task, and to execute tasks in a secondary mode when the controllers do not interact with the associated technical entities with respect to the task, each controller having a processor, which through the computer readable medium can be configured to execute the method comprising: a first action phase, wherein the plurality of controllers identify a managed controller of the controller system to consume redundancy for a first respective task by identifying a first peer controller, and identifying the managed controller of the controller system to provide redundancy by identifying a second peer controller that executes a second respective task in the primary mode; a second action phase, wherein the plurality of controllers allow the managed controller to execute the first respective task in the primary mode and execute the second respective task in the secondary mode, and first peer controller to execute the first respective task in the secondary mode, and the second peer controller to execute the second respective task in the primary mode; and a third action phase in that selectively: in a first case, the managed controller becomes non-available and the first peer controller takes over task execution by switching from the secondary mode to the primary mode for the first respective task, in a second case, the second peer becomes non-available and the managed controller takes over task execution by switching from the secondary mode to the primary mode for the second respective task.

An exemplary redundancy manager for use in a controller system is disclosed, the controller system having a plurality of controllers that are associated with technical entities and that are adapted to selectively execute tasks in a primary mode when the controllers interact with the associated technical entities with respect to the task, and to execute tasks in a secondary mode when the controllers do not interact with the associated technical entities with respect to the task, the redundancy manager comprising: a managed controller of the plurality of controllers that is loaded with a computer program such that the redundancy manager is configured to include: a first module that enables the managed controller to consume redundancy from a first peer controller that executes a first respective task in the secondary mode by identifying the first peer controller as a redundancy controller for the first respective task, by allowing the managed controller to execute the first respective task in the primary mode and allowing the first peer controller to execute the first respective task in a secondary mode, and by sending an activity message to the first peer controller until the managed controller becomes non-available; a second module that enables the managed controller to provide redundancy to a second peer controller that executes a second respective task in the primary mode by identifying the second peer controller, by allowing the managed controller to execute the second respective task in the secondary mode and verifying that the second peer controller executes the second respective task in the primary mode, by receiving an activity message from the second peer controller, and in case that receiving is interrupted, by instantiating the second respective task for execution by the managed controller in the primary mode.

BRIEF DESCRIPTION OF THE DRAWINGS

The disclosure itself, exemplary embodiments and improvements of the disclosure are disclosed and explained according to some illustrative examples and the accompanying drawings, wherein.

DETAILED DESCRIPTION

Figure 1:
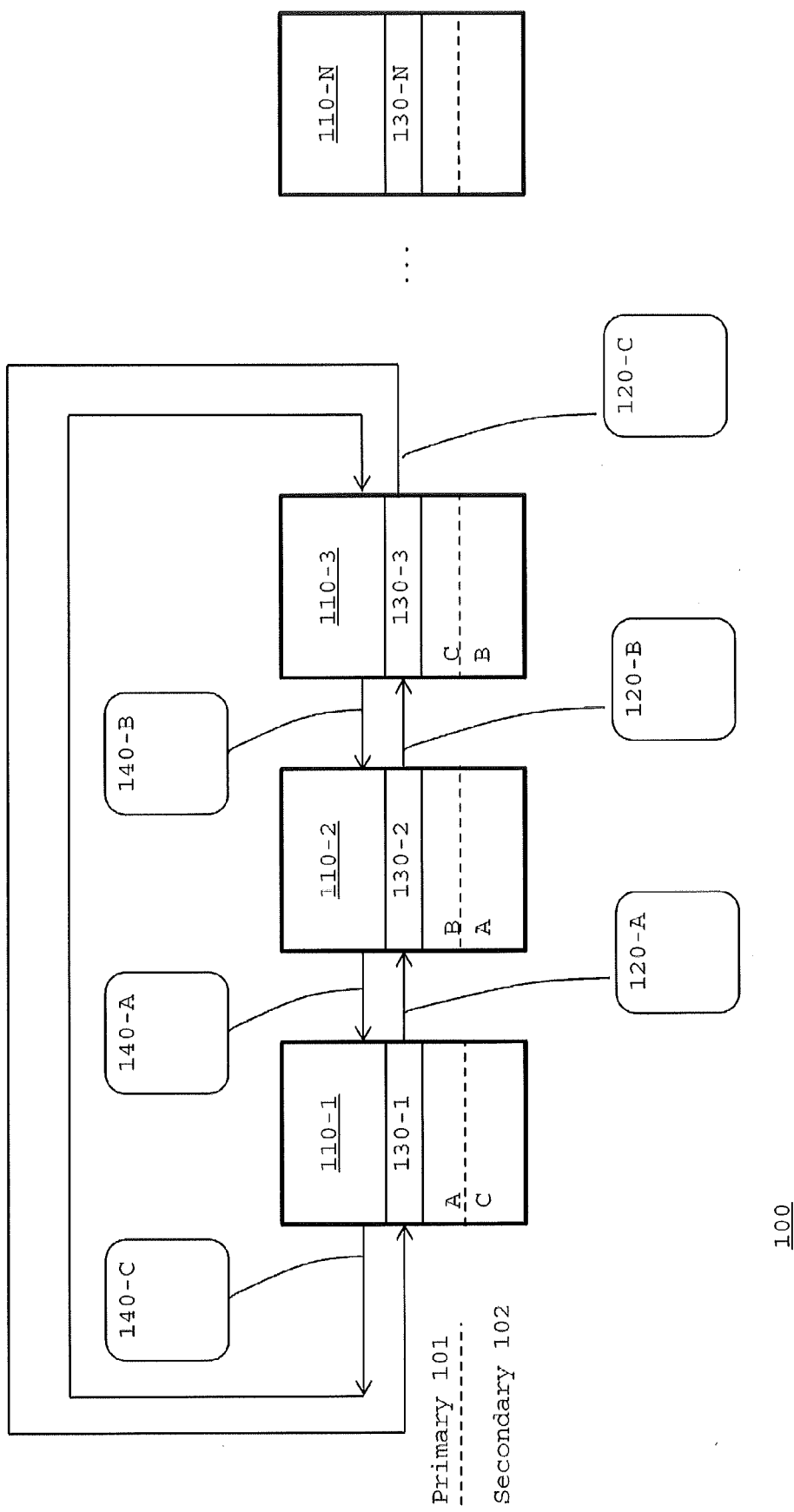
FIG. 1 illustrates a controller system with a plurality of controllers having redundancy managers according to an exemplary embodiment of the disclosure.

According to exemplary embodiments of the present disclosure, in a controller system and control system respectively the controllers can be associated with technical entities and can be adapted to selectively execute tasks in a primary mode when the controllers interact with the associated technical entities with respect to the tasks, and to execute tasks in a secondary mode when the controllers do not interact with the associated technical entities with respect to the task. The system is configured to distribute task instructions of a first task to a first controller that is configured to execute the first task in the primary mode and to distribute the task instructions of the first task to a second controller that is configured to execute the first task in the secondary mode. The system is configured to distribute task instructions of a second task to the second controller that is configured to execute the second task B in the primary mode. The system is further configured—upon non-availability of the first controller—to switch the second controller from the secondary mode for the first task to the primary mode for the first task, while the second controller is adapted to continue executing the second task in the primary mode.

The system can be configured to distribute task instructions of a third task to the first controller to execute the third task in the secondary mode, and can be configured—upon non-availability of the first controller—to switch the second controller to execute the third task in the secondary mode.

A controller in the secondary mode for a task can be configured to receive an activity message from a controller in the primary mode for the same respective task. The controller in the secondary mode for the task can be configured to receive the activity message periodically. The controller in the secondary mode for the task can be configured to receive the activity message with an activity signal indicative of the controller in the primary mode that continues to perform the same task. The controller in the secondary mode for the respective task can be configured to receive the activity message with a data signal that includes a copy of variables that can be generated during execution of the task instructions in the primary mode. The controller in the secondary mode for the task can be configured to receive the activity signal of the activity message and the data signal of the activity message at different frequencies. The controller in the secondary mode for a task can be configured to send a redundancy provision message to the controller that executes the respective task in the primary mode. The redundancy provision message is indicative that the controller in the secondary mode continues to execute the same respective task.

The controllers can be configured to have redundancy managers that, in cooperation with peer controllers, enable the respective controller to be a managed controller that is adapted to identify peer controllers so that the managed controller consumes peer redundancy and provides peer redundancy. The managed controller executes a first task in the primary mode and thereby consumes peer redundancy. The managed controller also executes a second task in the secondary mode and thereby provides peer redundancy. The managed controller switches over from the secondary mode to the primary mode for the second task upon non-availability of the peer.

A computer-implemented method for operating a controller system with a plurality of controllers is provided. The controllers can be associated with technical entities, and the controllers can be adapted to selectively execute tasks in a primary mode when the controllers interact with the associated technical entities with respect to the task, and to execute tasks in a secondary mode when the controllers do not interact with the associated technical entities with respect to the task. In a first action phase IDENTIFY, the system identifies a managed controller of the controller system to consume redundancy for a first task by identifying a first peer controller, and identifies the managed controller of the controller system to provide redundancy by identifying a second peer controller that executes a second task in the primary mode. In a second action phase EXECUTE, the system lets the managed controller execute the first respective task in the primary mode and execute the second respective task in the secondary mode, and lets the first peer controller execute the first task in the secondary mode, and the second peer controller execute the second task in the primary mode. In a third action phase CHANGE two cases can occur. In a first case, the managed controller becomes non-available and the first peer controller takes over task execution by switching from secondary mode to primary mode for the first task. In a second case, the second peer becomes non-available and the managed controller takes over task execution by switching from secondary mode to primary mode for the second task.

The second action phase EXECUTE can include periodically sending a first activity message from the managed controller to the first peer controller, and periodically receiving a second activity message from the second peer controller.

The third action phase CHANGE can be triggered in the first case with the managed controller no longer sending the activity message, or can be triggered in the second case with the managed controller no longer receiving the second activity message from the second peer controller.

The second action phase EXECUTE can include to periodically send a redundancy provision message to the second peer controller for the second task. The second action phase EXECUTE can include to periodically receive a further redundancy provision message from the first peer controller, and the first action phase IDENTIFY can be repeated if the further redundancy provision message stops, so that the managed controller identifies a replacement controller for the first task to be executed in the secondary mode by the replacement controller.

An exemplary embodiment of the present disclosure includes a redundancy manager for use in a controller system. In the system, a plurality of controllers can be associated with technical entities that can be adapted to selectively execute tasks in a primary mode when the controllers interact with the associated technical entities with respect to the task, and to execute tasks in a secondary mode when the controllers do not interact with the associated technical entities with respect to the task. The redundancy manager is implemented as a computer program to be loaded into a managed controller of the plurality of controllers. The redundancy manager includes modules: A first module enables the managed controller to consume redundancy from a first peer controller that executes a first respective task in the secondary mode by identifying the first peer controller as redundancy controller for the first task, by letting the managed controller execute the first task in the primary mode and by letting the first peer controller execute the first task in the secondary mode, and by sending an activity message to the first peer controller until the managed controller becomes non-available. A second module enables the managed controller to provide redundancy to a second peer controller that executes a second task in the primary mode by identifying the second peer controller, by letting the managed controller execute the second respective task in the secondary mode, by verifying that the second peer controller executes the second task in the primary mode, by receiving an activity message from the second peer controller, and in case that receiving is interrupted, by instantiating the second task for execution by the managed controller in the primary mode.

In an industrial environment, the controllers can be implemented as rail-mounted modules with central processing unit (CPU), communication module and power supply module.

Consequently, substantially no additional redundant controllers can be specified in order to achieve high availability by fault tolerance. The peer-to-peer redundancy scheme scales according to various specifications. In systems with N controllers, several system arrangements can be possible. For example, each of the N controllers (primary) can have a peer controller (secondary) to provide redundancy. In a further example, each of the N controller uses redundancy from the other N−1 controllers in the system.

Exemplary embodiments of the disclosure will be explained with reference to a system with peer controllers that operate in action phases IDENTIFY, EXECUTE and CHANGE (cf. FIG. 5). In phase IDENTIFY at time point t0, the system identifies controllers to execute tasks in either primary mode or in the secondary mode. In phase EXECUTE at time point t1 (FIG. 1), the controllers can be available and execute the tasks. In phase CHANGE at time points t2 and t3 (FIGS. 2, 3), at least one controller has become non-available. Some of the remaining controllers take over task execution and switch from secondary to primary mode (t2) and from primary to secondary mode (t3).

Figure 3:
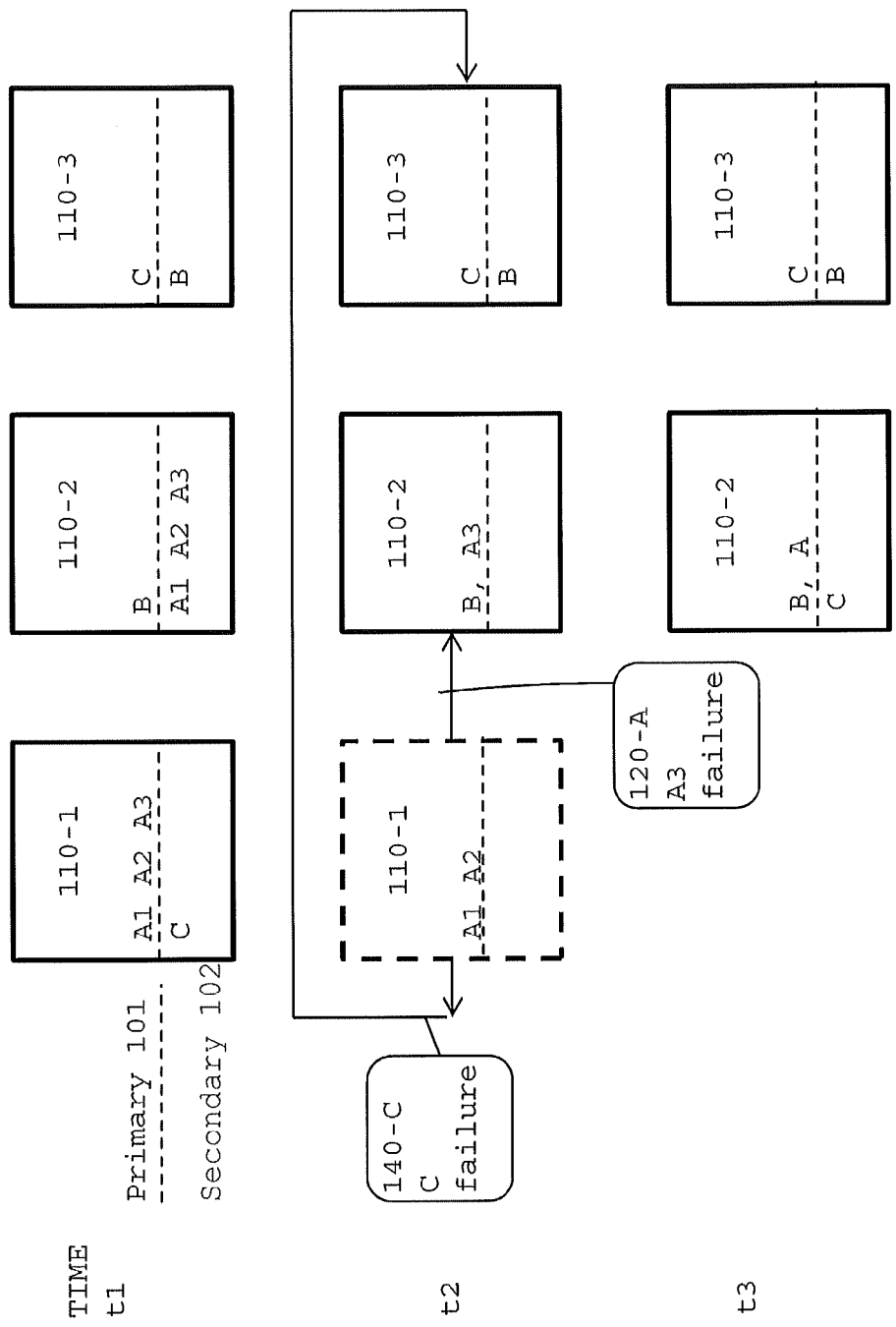
FIG. 3 illustrates a scenario with the first, second, and third controllers at different points in time as in FIG. 2, but with the assumption that the first controller is non-available only partially according to an exemplary embodiment of the disclosure.
Figure 4:
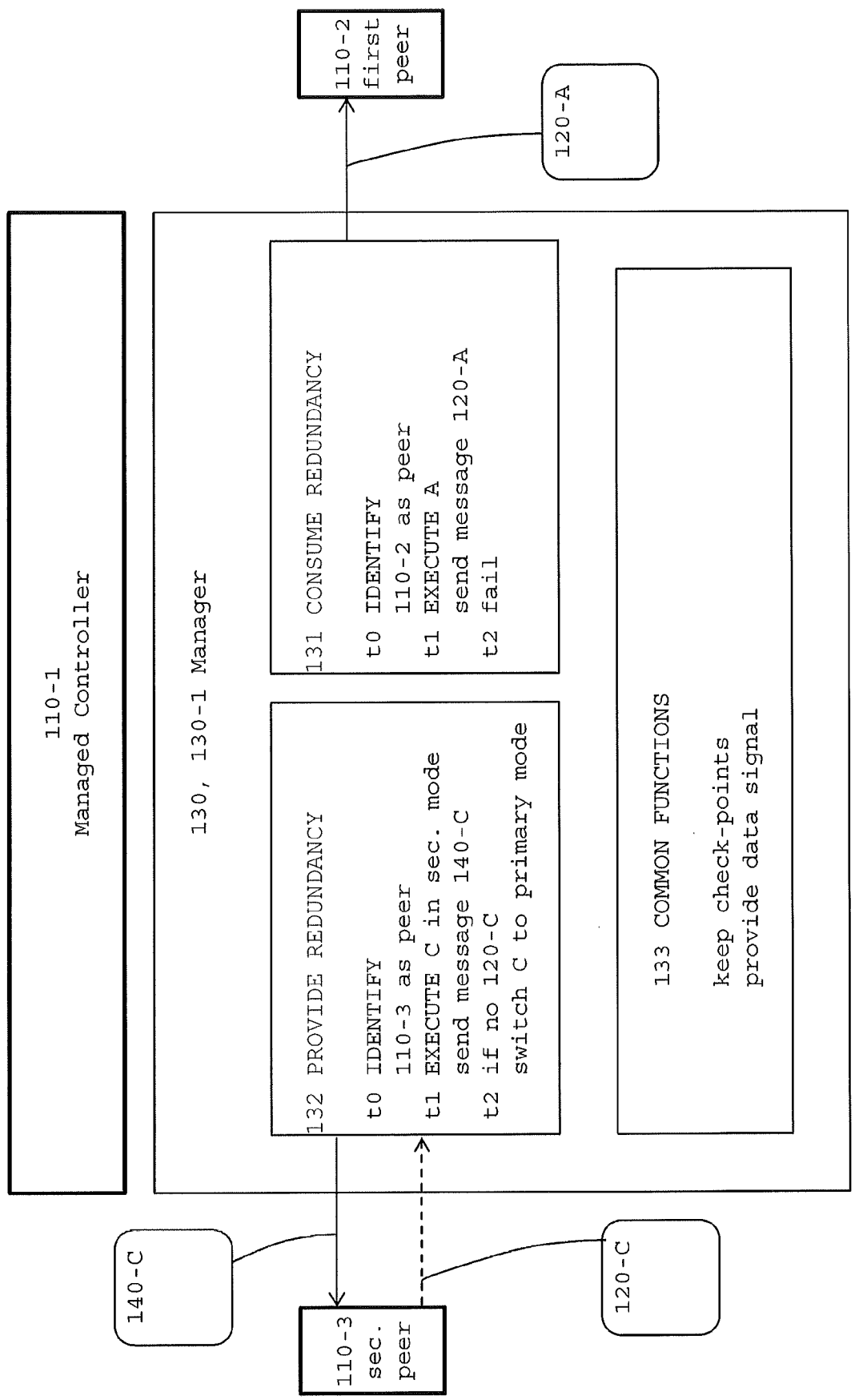
FIG. 4 illustrates a redundancy manager in a controller of the system according to an exemplary embodiment of the disclosure.

The operation of the controllers (in the action phases IDENTIFY, EXECUTE and CHANGE) can be distinguished into operations to PROVIDE redundancy and to CONSUME redundancy (FIGS. 3-4).

FIG. 1 illustrates a controller system with a plurality of controllers having redundancy managers according to an exemplary embodiment of the disclosure. As shown in FIG. 1, a controller system 100 includes a plurality of controllers 110-1, 110-2, 110-3 . . . 110-N having redundancy managers 130-1, 130-2, 130-3 . . . 130-N.

The controllers can be communicatively coupled via a network or the like, for example, a network with a TCP/IP protocol (for example, internet, intranet), a Control Network protocol MMS (Manufacturing Message Service), an IAC (Inter Application Communication) protocol or others. The underlying protocols can include Industrial controller network protocols known for example as fieldbus, or industrial Ethernet (FF HSE, Ethernet/IP, Modbus/TCP, PROFINET, IEC-61850 etc.). Persons of skill in the art can provide the appropriate network without further explanation. The network allows the controller to exchange messages, such as activity messages 120-1, 120-B, 120-C (collectively 120) and redundancy provision messages 140-A, 140-B, 140-C (collectively 140).

As it will be explained, redundancy is actively provided and redundancy is passively consumed to mitigate temporary non-availability of controllers. A redundancy of the network can be provided according to traditional redundancy schemes (for example, standby redundancy).

As already mentioned, the controllers can be associated with technical entities such as industrial machines or plants to perform technical processes, for example, in manufacturing industries. At a different granularity level, the controller can also be associated with components of such machines.

The controllers can be physically separated from the entities, or the controllers can be integral parts of the entities. In an example, the controllers belong to a system with integrated environment of power automation, process electrification or process instrumentation. Taking process instrumentation as an example, the tasks relate to the various steps of a technical process.

In a further example, the controllers can be part of a monitoring module of an industrial robot. In the example, the monitoring module executes tasks that relate to monitoring the robot, and sensor controllers control the sensors. One or more sensors can be assigned to one sensor so that multiple controllers can control an even larger number of sensors.

The tasks that can be executed by the controllers can be grouped into applications and programs. It is possible to provide redundancy at the level of applications and programs. The teachings herein for tasks can be applied to applications and programs or other form likewise without further explanation.

The controllers have a processor and memory. The controllers can execute tasks in two execution modes: For a controller that executes a task in a primary mode 101 (or "main mode", "master mode"), the task instructions have already been instantiated so that the controller interacts with the technical entities with respect to the task at a predefined interaction level. For a controller that executes a task in the secondary mode 102 (or "redundancy mode", "standby mode", or "slave mode"), the task instructions are not yet accessed by the processor (e.g., not yet instantiated) so that there is no technical interaction at that interaction level. In other words, a controller in a primary mode executes a task as a primary controller, and a controller in a secondary mode executes a task as a secondary controller.

In terms of the above-introduced consume/provide distinction, the primary controller consumes redundancy from a secondary controller, and the secondary controller provides redundancy to the primary controller. A single controller can execute different tasks both as a primary controller and as a secondary controller.

The interaction level can be defined with respect to the processor, to the memory, or to combinations thereof. For example, a processor can operate or not, can execute a task or not execute a task, can output signals or not, and so on. With respect to the memory, there can be several options possible as well. According to a first option, the task instructions can be in the memory of the primary controller; but the task instructions are not yet in the memory of the secondary controller. According to a second option, there is a distinction between main memory (RAM) and storage memory (for example, flash memory for storage of application and data). The task instructions can be in the main memory of the primary controller; but the task instructions can be in the storage memory of the secondary controller. According to a third option, the task instructions can be in main memory (RAM) for both modes. Task instructions for the primary modes can be executed (e.g., instantiated), and task instructions for the secondary mode remain resident in memory until being instantiated. According to a fourth option ("hot standby"), both controllers execute the tasks simultaneously, but only the results of the primary controller can be used to interact with the technical entities. Other options can be available to those of skill in the art without further explanation.

As mentioned, the modes can be related to respective tasks, so that a controller can simultaneously execute different tasks in the primary mode and in the secondary mode.

The operation of controller system 100 will be explained for a simplified example with 3 controllers 110-1, 110-2 and 110-3, but the principle can be applied to N>3 controllers as well. For convenience, tasks and task instructions can be indicated by uppercase letters A, B, or C. Dashed horizontal lines distinguishes the modes. A letter above the line indicates primary mode 101; a letter below the line indicates secondary mode 102.

It is assumed that the action phase IDENTIFY at t0 has been completed already, and that system 100 operates in phase EXECUTE. In the example, controller 110-1 executes task A in a primary mode and executes task C in a secondary mode, controller 110-2 executes task B in the primary mode and executes task A in the secondary mode, and controller 110-3 executes task C in the primary mode and executes task B in the secondary mode. The other controllers, such as 110-N execute other tasks.

The modes can be controlled by redundancy managers 130-1, 130-2, 130-3 ... 130-N (details in FIG. 4). The managers have established peer-to-peer communication between the controllers, by activity messages 120 and by redundancy provision messages 140. In the example, the activity messages 120-A, 120-B and 120-C can be related to tasks A, B, and C, respectively. The activity messages 120 go from the primary controller to the secondary controller (with respect to the task). In the figure, activity messages 120 can be illustrated by arrows to the right.

According to an exemplary embodiment, controller 110-1, which executes task A in a primary mode, sends message 120-A to controller 110-2 that executes task A in a secondary mode. Controller 110-2 (primary mode for B) sends message 120-B to controller 110-3 (secondary mode for B). Controller 110-3 (primary mode for C) sends message 120-C to controller 110-1 (secondary mode for C). Activity messages 120 can be sent and received periodically. The period can be different for each message.

Activity messages 120 can be implemented by different logics. The person of skill in the art can select the most suitable logic. The controller in the primary mode sends out a periodic message, a so-called "heartbeat", and the secondary controller detects non-availability (for example, an unexpected failure) when it no longer receives the message within a period (positive logic).

In the alternative, the controller in the primary mode sends out a message upon becoming non-available. (The term "activity message" includes "non-availability message".) Such a negative logic can have the advantage to avoid network consumption by period messages. This alternative is useful in failure scenarios (failure messages), and also useful in maintenance scenarios where the primary controller is to be maintained (maintenance message). As it will be illustrated below, the message can include various task status information.

Both alternatives could be combined: period messages (heartbeat) can deal with unexpected failures, and extra messages can be used for smooth task transition in maintenance scenarios.

The activity messages can be implemented as a one-to-many message, which is a message that carries identification of the originating controller, or as a one-to-one message (for example, primary controller to secondary controller).

While activity messages 120 go from controllers in the primary mode to controllers in the secondary mode (for a respective task; arrows to the right) to instantiate tasks if needed (switch from secondary to primary mode, action CHANGE), the controllers in the primary mode should receive signals that indicate the availability of a controller in the secondary mode (e.g., a redundancy controller).

As shown in FIG. 1, this can be accomplished by redundancy provision messages 140 (arrows to the left). Redundancy provision message 140-B from controller 110-3 to controller 110-2 indicates that redundancy can be provided for task B by controller 110-3 in the secondary mode (e.g., in standby). Redundancy provision messages 140-A and 140-C apply the same principle.

In the example of FIG. 1, the redundancy provision messages 140 follow the same logic as the activity messages 120: Non-arrival of a message causes the redundancy manager to look for an alternative by starting a search routine or a controller identification routine.

According to exemplary embodiments of the present disclosure, other messaging schemes can include schemes that use acknowledgements to the activity messages. In that case, the acknowledgement would share functionality with the provision messages. The messages can be implemented as synchronous messages or as asynchronous messages.

Figure 2:
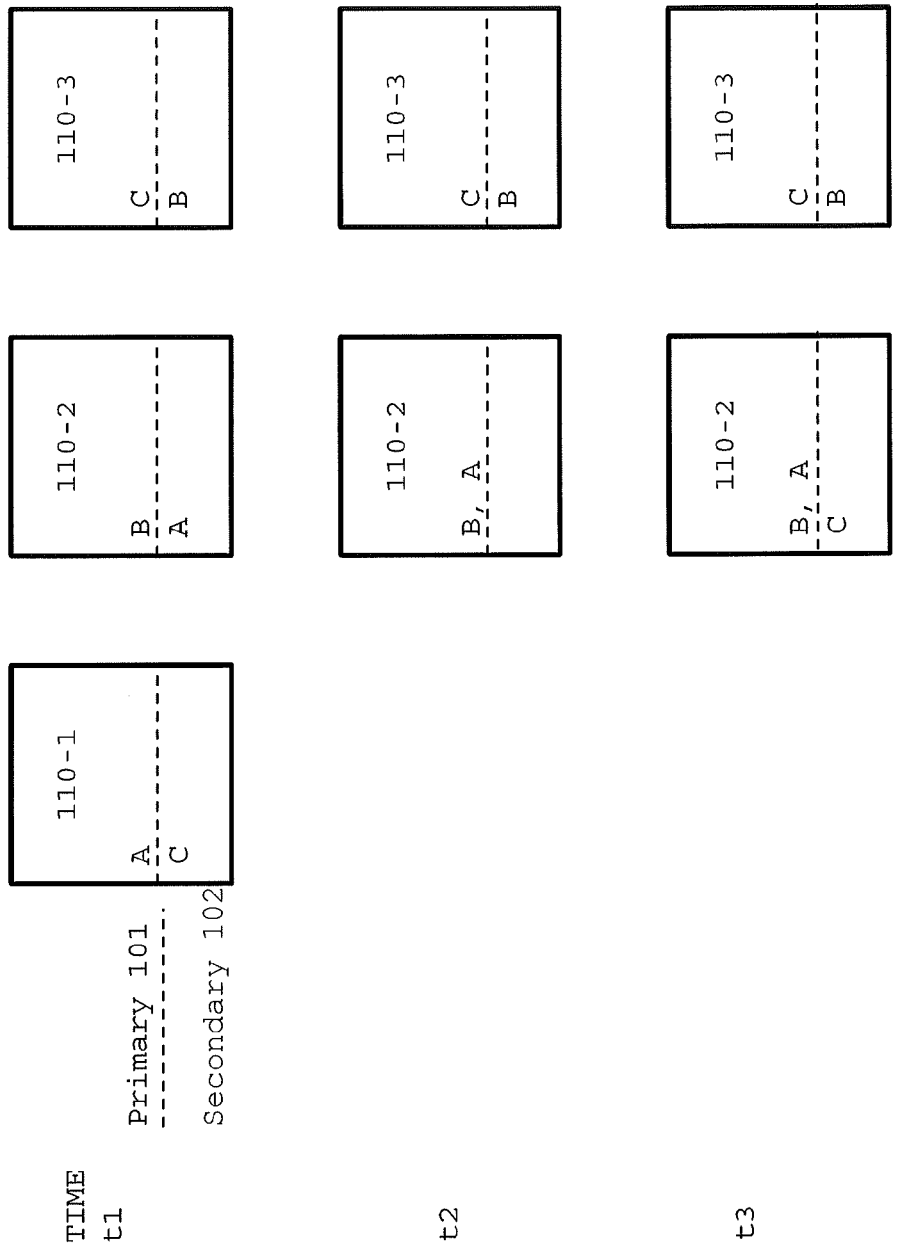
FIG. 2 illustrates a scenario with first, second, and third controllers of the system at different points in time, with an assumed total non-availability of the first controller from a specified point in time according to an exemplary embodiment of the disclosure.

Having explained the structure of the system with the focus to the action phase EXECUTE, the description of FIGS. 2-3 continues with the action phase CHANGE.

FIG. 2 illustrates a scenario with first, second, and third controllers of the system at different points in time, with an assumed total non-availability of the first controller from a specified point in time according to an exemplary embodiment of the disclosure.

At time point t1 controller 110-1, 110-2 and 110-3 execute tasks A, B, and C, respectively, in a primary mode (EXECUTE phase as in FIG. 1). Peer-to-peer redundancies can be established by letting controller 110-2 executes task A in a secondary mode, controller 110-3 executes task B in the secondary mode, and controller 110-1 executes task C in the secondary mode. Messages 120 and 140 continue to move through the system as described above in connection with FIG. 1.

The controllers provide/consume redundancy to/of each other, but for simplicity of explanation, it will be explained how controller 110-1 consumes redundancy and how controller 110-2 provides redundancy (to controller 110-1 and—after the change—to controller 110-3).

At time point t2, controller 110-1 has become completely (totally) non-available. As a consequence, the redundancy manager in controller 110-2 no longer receives activity message 120-A (cf. FIG. 1). Redundancy manager 130-2 instantiates task instructions A in controller 110-2 so that controller 110-2 switches from the secondary mode to the primary mode for task A. Controller 110-2 continues to execute task B in the primary mode.

Due to the failure of controller 110-1, message 140-C (controller 110-1 as redundancy for C) no longer arrives at controller 110-3. As a consequence, redundancy manager 130-3 starts a search routine to identify a suitable controller to act as secondary controller for task C (repetition of action phase IDENTIFY). The search routine can include exchanges with other controllers in the system. For example, the search routine sends out a broadcasting message to the other controllers in the system. While a broadcasting message is a one-to-many message to all connected controllers, other messages can be used as well, such as one-to-one messages when the sending controller has already identified the receiving controller.

At time point t3, controller 110-2 has been identified as the redundancy controller (secondary mode controller) for task C. This can be accomplished, for example, by transferring the task instructions from controller 110-3 (primary for C) to controller 110-2, action phase EXECUTION. Controller 110-2 is now providing redundancy for task C to controller 110-3 (that consumes redundancy). Other options can be possible, for example, loading the instructions from an instruction repository.

FIG. 3 illustrates a scenario with the first, second, and third controllers at different points in time as in FIG. 2, but with the assumption that the first controller is non-available only partially according to an exemplary embodiment of the disclosure.

As shown in FIG. 3, at t1, controller 110-1 executes tasks A1, A2, and A3 in the primary mode, and controller 110-2 can be the controller to execute tasks A1, A2, and A3 in the secondary mode (standby).

At t2, as symbolized by a dashed frame, controller 110-1 has partially become non-available and as a consequence, it can no longer execute the tasks A1, A2 and A3 (primary mode) and cannot longer act in the secondary mode for task C. Controller 110-1 still executes A1 and A2. Messages are still available from controller 110-1: message 120-A indicates non-availability to execute A3 (to controller 110-1) and message 140-C indicates non-availability to be the redundancy for task C (to controller 110-3). The redundancy manager has arranged that controller 110-2 switches to primary mode for A3.

At t3, controller 110-2 has taken over task C in the secondary mode (standby).

In other words, one controller (110-1) can be defective and shows a degraded functionality (partial functionality), and a peer-controller (110-2) takes over functionality (task A3 primary, task C secondary).

The description continues with explaining how the redundancy provision and consumption can be implemented.

FIG. 4 illustrates redundancy manager 130 in a controller of the system according to an exemplary embodiment of the disclosure. The explanation takes the manager of the first controller as an example (manager 130-1 for controller 110-1). The action phases can be distinguished again: IDENTIFY at t0 (to identify peer controllers to be the primary/secondary controller), EXECUTE at t1 (cf. FIGS. 2-3) and CHANGE at t2 (cf. FIGS. 2-3).

In view of the peer controllers, the managers have basically two functions: consume redundancy 131 and provide redundancy 132. The functions can be substantially performed during all action phases IDENTIFY, EXECUTE, and CHANGE. FIG. 4 illustrates the functions in an implementation by separate modules, but some functions can partly overlap and can be implemented in a re-use or share-use implementation (common functions 133). The managers communicate with the managers of its peer controllers, for example by receiving and sending messages 120, 140.

The first function "consume redundancy" 131 relates to consuming (or using) standby from a peer. For example, at t0, manager 130-1 identifies controller 110-2 as standby controller. This can be accomplished by executing the above-mentioned identification routines. The identification routines can include to automatically identify a controller according to predefined criteria, to interact with an administrator user (via a user interface for the system), to access a look-up allocation table that can be part of the network or to identify the controller otherwise. At t1, controller 110-1 executes task A as primary controller and thereby consumes redundancy from controller 110-2 that executes task A as secondary controller (operation peer). Manager 130-1 sends activity message 120-A to its counterpart at 110-2 until controller 110-1 becomes non-available at t2 (for example, by failure).

The second function "provide redundancy" 132 relates to providing redundancy to a peer. At t0, manager 130-1 identifies controller 110-3 by the identification routines. At t1, controller 110-1 (standby peer) provides redundancy to controller 110-3 (operation peer) for task C. Manager 130-1 sends redundancy provision message 140-C to controller 110-3 and receives activity message 120-C (from controller 110-3). In case that controller 110-3 would become non-available (t2, t3), message 120-C would be absent and manager 130-1 would instantiate task C into controller 110-1. In other words, manager 130-1 would switch controller 110-1 from the secondary tithe primary mode for task C.

Optionally, manager 130-1 can provide common functions. Manager 130-1 can store checkpoints that assist the resumption to operation by controllers that change from primary to secondary mode (for example, controller 110-1). The checkpoints can be data structures with variables, status information etc. related to the execution of tasks. The checkpoints can be communicated as data signals that can be part of the activity messages (primary to secondary controller at t1), and the checkpoints can also be used to identify suitable peer controllers at t0.

In other words, the controller/manager in a secondary mode receives activity message 120 with the data signal that includes a copy of the variables that can be generated during execution of task instructions in a primary mode. The same principle applies to sending such signals, the variables can be copied into signals likewise.

While activity messages 120 can be a simple yes/no activity signal, the data signal would use more bandwidth and memory. It can be advantageous to send and receive both signals at different frequencies, for example to communicate data signals at larger periods and activity signals at shorter periods.

It can be noted that the managers in the other controllers operate in a similar way. The other controllers in the systems can also be regarded as managed controllers and as peer controllers. For example, at t0, manager 130-3 in controller 110-3 identifies controller 110-1 as a peer as well. Or, manager 130-2 sends out activity message 140-A (cf. FIG. 1) that can be received from controller 110-2 in order to confirm that redundancy is still provided (by controller 110-2).

A controller can also be considered as a computer. Therefore, FIG. 4 also illustrates a computer program or a computer program product. The computer program product—when loaded into a memory of the computer (for example, of the controller) and being executed by at least one processor of the computer—performs the steps of the computer-implemented method. In other words, functions 131, 132 and 133 stand for program modules and illustrate that the method can be implemented under the control of the program.

Figure 5:
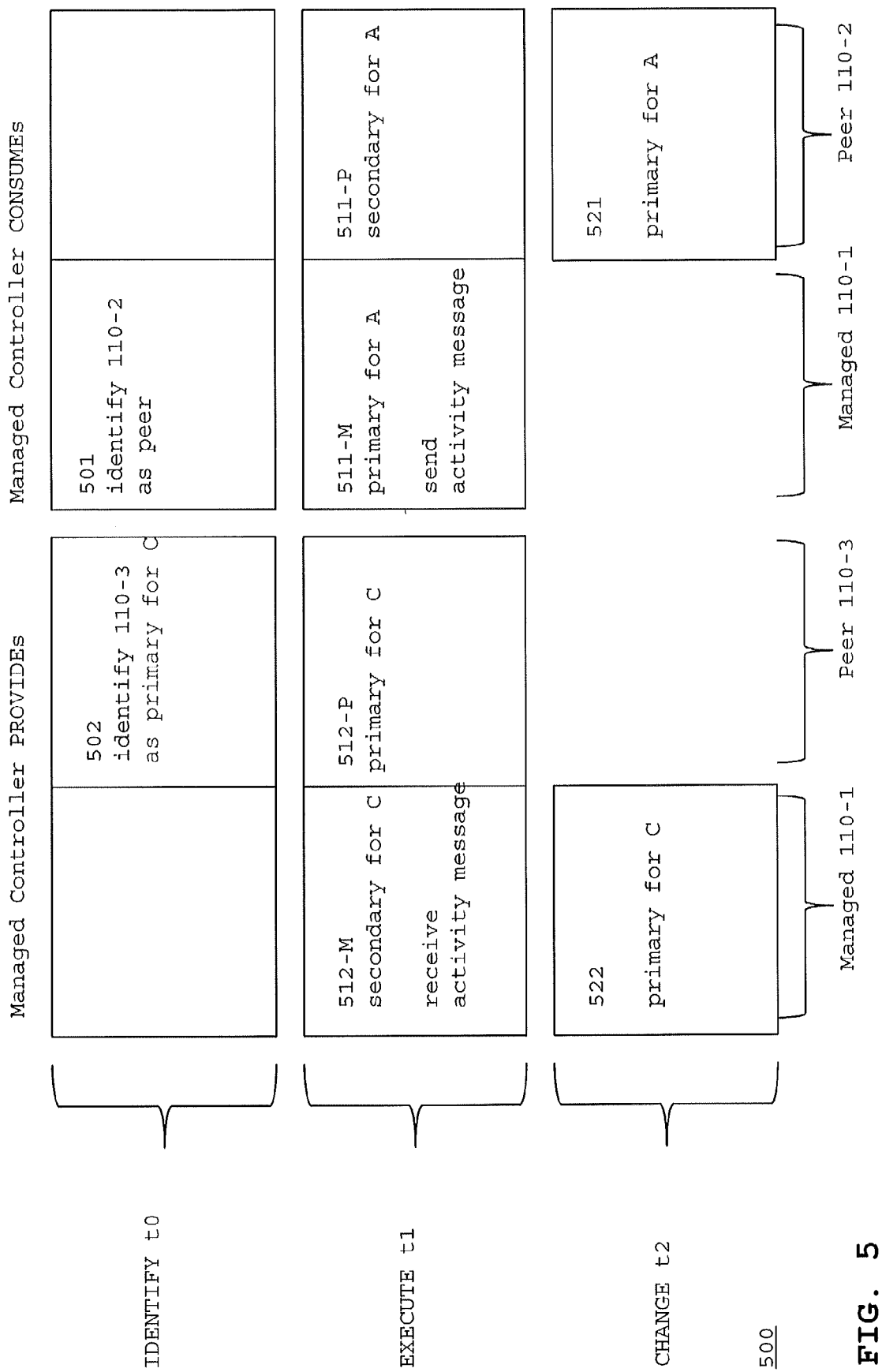
FIG. 5 illustrates a diagram of a computer-implemented method to operate the controller system according to an exemplary embodiment of the disclosure.

FIG. 5 illustrates a diagram of a computer-implemented method to operate the controller system according to an exemplary embodiment of the disclosure. References to controllers and task correspond to the example of FIG. 4. In the flowchart, the progress of time can be indicated in top-down direction (t0, t1, t2). Blocks illustrate actions by the controllers. The explanation can be applicable for substantially all controllers (and redundancy managers), but for simplicity, controllers 110-1, 110-2 and 110-3 are taken as the illustrative example. Managed controller 110-1 can be the controller that acts both to consume and to provide redundancy under control of its redundancy manager. Controllers 110-1 and 110-3 are the peer controllers to the managed controller.

As explained above, a plurality of controllers (for example, N=3) can be associated with technical entities and the controllers can be adapted to selectively execute tasks in the primary mode (when the controllers interact with the associated technical entities with respect to the task), and to execute tasks in the secondary mode (when the controllers do not interact with the associated technical entities with respect to the task).

In a first action phase (IDENTIFY), the controller system identifies the managed controller (for example, 110-1) of the controller system to consume redundancy for a first task (for example, task A) by identifying 501 a first peer controller (for example, 110-2). The system also identifies the managed controller (110-1) of the controller system to provide redundancy by identifying 502 a second peer controller (for example, 110-3) that executes a second task (for example, task C) in the primary mode.

In a second action phase (EXECUTE), the system lets the managed controller (110-1) execute 511-M the first task (A) in the primary mode and execute 512-M the second task (C) in the secondary mode, and first peer controller (110-2) to execute 511-P the first task (A) in the secondary mode, and the second peer controller (110-3) to execute 512-P the second task (C) in the primary mode.

In a third action phase (CHANGE), there can be two cases to distinguish. In a first case, the managed controller (110-1) itself becomes non-available (no block illustrated at t2) and the first peer controller (110-2) takes over task execution by switching 521 from the secondary mode to the primary mode for the first task (A). In a second case, the second peer (110-3) becomes non-available and the managed controller 110-1 takes over task execution by switching (522) from the secondary mode to the primary mode for the second respective task (C).

Optionally, the method repeats with action IDENTIFY, for example to identify controllers to operate in the secondary mode. An example was given in connection with FIG. 2 (at t3).

Looking at activity messages 120, the second action EXECUTE of method 500 can include periodically sending a first activity message 120-A from managed controller 110-1 to first peer controller 110-2, and periodically receiving a second activity message 120-C from second peer controller 110-3. In such cases, the third action CHANGE can be triggered in the first case with the managed controller (110-1) no longer sending the activity message 120-A, or can be triggered in the second case with the managed controller 110-1 no longer receiving the second activity message 120-C from the second peer controller 110-3. As a rule, activity messages go from a redundancy consuming controller to a redundancy providing controller.

Looking at redundancy provision messages 140, the second action phase (EXECUTE) of method 500 can include to periodically sending redundancy provision message 140-C to second peer controller 110-3 for the second respective task C (cf. FIG. 4). The second action phase (EXECUTE) can also include periodically receiving a further redundancy provision message (for example, 140-A, FIG. 1) from first peer controller 110-2. The first action phase (IDENTIFY) would be repeated if the further redundancy provision message stops, so that the managed controller 110-1 identifies a replacement controller for the first respective task (A) to be executed in the secondary mode by the replacement controller. An example has been explained in connection with FIG. 2. As a rule, redundancy provision messages go from a redundancy consuming controller to a redundancy providing controller.

As mentioned above, the messages can follow different logics, but persons of skill in the art can adapt the method without further explanation herein.

Exemplary embodiments have been described with reference to a system with three controllers, and for a redundancy manager that could be implemented in any of these controllers. However, various modifications can be possible. Non-availability can be anticipated. This operation can be applicable for maintenance scenarios. The checkpoint state of the controllers can be synchronized prior to replacing a controller. The modes can be modified, for example by introducing further modes. For example, a controller in a preliminary primary mode ("hot" standby) starts processing data, but is not yet outputting processed data until it goes into the effective primary mode (e.g., processing and outputting data). Such an approach can increase switchover speed and avoid delays etc.

Exemplary embodiments of the disclosure can be implemented in digital electronic circuitry, or in computer hardware, firmware, software, or in combinations of them. The disclosure can be implemented as a computer program product, for example, a computer program tangibly embodied in a non-transitory information carrier (e.g., computer readable medium), for example, in a machine-readable storage device, for execution by, or to control the operation of, data processing apparatus, for example, a programmable processor, a computer, or multiple computers. According to exemplary embodiments described herein, a computer program can be written in any programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network. The described methods can all be executed by corresponding computer products on the respective devices, for example, the first and second computers, the trusted computers and the communication means.

Exemplary methods of the present disclosure can be performed by one or more programmable processors executing a computer program to perform functions of the disclosure by operating on input data and generating output. Method steps can also be performed by, and apparatus of the disclosure can be implemented as, special purpose logic circuitry, for example, a field programmable gate array (FPGA) or an application-specific integrated circuit (ASIC).

According to an exemplary embodiment of the present disclosure, processors suitable for the execution of a computer program include, by way of example, both generic and special purpose microprocessors, and any one or more processors of any kind of digital computing device. A processor will receive instructions and data from a read-only memory or a random access memory or both. Exemplary elements of a computer can include at least one processor for executing instructions and one or more memory devices for storing instructions and data. A computer can also include, or be operatively coupled to receive data from or transfer data to, or both, one or more mass storage devices (e.g., storage means) for storing data. The storage devices can include, for example, magnetic, magneto-optical disks, optical disks or solid state disks. Such storage means may also be provisioned on demand and be accessible through the Internet (for example, Cloud Computing). Information carriers suitable for embodying computer program instructions and data include all forms of non-volatile memory, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in special purpose logic circuitry.

To provide for interaction with a user, the disclosure can be implemented on a computer having a display device, for example, a cathode ray tube (CRT) or liquid crystal display (LCD) monitor, for displaying information to the user and an input device such as a keyboard, touchscreen or touchpad, a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

The disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the disclosure, or any combination of such back-end, middleware, or front-end components. Client computers can also be mobile devices, such as smartphones, tablet PCs or any other handheld or wearable computing device. The components of the system can be interconnected by any form or medium of digital data communication, for example, a communication network. Examples of communication networks include a local area network (LAN) and a wide area network (WAN), for example, the Internet or wireless LAN or telecommunication networks.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A controller system comprising:
a plurality of controllers each being associated with technical entities, each controller is configured to selectively execute a task in a primary mode when the controller interacts with the associated technical entity with respect to the task, and to execute the task in a secondary mode when the controller does not interact with the associated technical entity with respect to the task,
wherein task instructions of a first task are distributed to a first controller configured to execute the first task in the primary mode, and to distribute the task instructions of the first task to a second controller that is configured to execute the first task in the secondary mode,
wherein task instructions of a second task are distributed to the second controller that is configured to execute the second task in the primary mode,
wherein the system is configured, upon non-availability of the first controller, to switch the second controller from the secondary mode for the first task to the primary mode for the first task, while the second controller is adapted to continue executing the second task in the primary mode, and
wherein each controller is configured to have a redundancy manager that, in cooperation with peer controllers, enable an associated controller to be a managed controller that is configured to identify peer controllers so that the managed controller consumes peer redundancy and provides peer redundancy, to execute a first respective task in the primary mode while consuming peer redundancy and to execute a second respective task in the secondary mode while providing peer redundancy, and to switch over from the secondary mode to the primary mode for the second respective task upon non-availability of the peer.

2. The controller system according to claim 1, configured to distribute task instructions of a third task to the first controller to execute the third task in the secondary mode, and configured, upon non-availability of the first controller, to switch the second controller to execute the third task in the secondary mode.

3. The controller system according to any of claim 1, wherein a controller in the secondary mode for a respective task is configured to receive an activity message from a controller in the primary mode for the respective task.

4. The controller system according to claim 3, wherein the controller in the secondary mode for the respective task is configured to receive the activity message periodically.

5. The controller system according to any of claim 3, wherein the controller in the secondary mode for the respective task is configured to receive the activity message with an activity signal indicative of the controller in the primary mode continuing to perform the respective task.

6. The controller system according to any of claim 3, wherein the controller in the secondary mode for the respective task is configured to receive the activity message with a data signal that includes a copy of variables that are generated during execution of the task instructions in the primary mode.

7. The controller system according to claim 5, wherein the controller in the secondary mode for the respective task is configured to receive the activity signal of the activity message and the data signal of the activity message at different frequencies.

8. The controller system according to any of claim 1, wherein the controller in the secondary mode for a respective task is configured to send a redundancy provision message to the controller that executes the respective task in the primary mode, the redundancy provision message indicative that the controller in the secondary mode continues to execute the respective task.

9. A non-transitory computer readable medium for executing a method of operating a controller system having a plurality of controllers that are associated with technical entities and that are adapted to selectively execute tasks in a primary mode when the controllers interact with the associated technical entities with respect to the task, and to execute tasks in a secondary mode when the controllers do not interact with the associated technical entities with respect to the task, each controller having a processor and is configured to have a redundancy manager, which through the computer readable medium can be configured to execute the method comprising:
a first action phase, wherein the plurality of controllers identify a managed controller of the controller system, which through the redundancy manager in cooperation with the plurality of controllers consumes redundancy for a first respective task by identifying a first peer controller, and identifying the managed controller of the controller system to provide redundancy by identifying a second peer controller that executes a second respective task in the primary mode;
a second action phase, wherein the plurality of controllers allow the managed controller through the redundancy manager in cooperation with the plurality of controllers to execute the first respective task in the primary mode and execute the second respective task in the secondary mode, and the first peer controller to execute the first respective task in the secondary mode, and the second peer controller to execute the second respective task in the primary mode; and
a third action phase in that selectively:
in a first case, the managed controller becomes non-available and the first peer controller takes over task execution by switching from the secondary mode to the primary mode for the first respective task, in a second case, the second peer becomes non-available and the managed controller takes over task execution by switching from the secondary mode to the primary mode for the second respective task.

10. The computer-readable medium according to claim 9, wherein the second action phase includes periodically sending a first activity message from the managed controller to the first peer controller, and periodically receiving a second activity message from the second peer controller.

11. The computer-readable medium according to claim 10, wherein the third action phase is triggered in the first case with the managed controller no longer sending the activity message, or is triggered in the second case with the managed controller no longer receiving the second activity message from the second peer controller.

12. The computer-readable medium according to claim 9, wherein the second action phase includes periodically sending a redundancy provision message to the second peer controller for the second respective task.

13. The computer-readable medium according to claim 12, wherein the second action phase includes periodically receiving a further redundancy provision message from the first peer controller and the first action phase is repeated if the further redundancy provision message stops, so that the managed controller identifies a replacement controller for the first respective task to be executed in the secondary mode by the replacement controller.

14. A redundancy manager for use in a controller system having a plurality of controllers that are associated with technical entities and that are adapted to selectively execute tasks in a primary mode when the controllers interact with the associated technical entities with respect to the task, and to execute tasks in a secondary mode when the controllers do not interact with the associated technical entities with respect to the task, the redundancy manager comprising:

a managed controller of the plurality of controllers that is loaded with a computer program so that the redundancy manager is configured to include:

a first module that enables the managed controller to consume redundancy from a first peer controller that executes a first respective task in the secondary mode by identifying the first peer controller as a redundancy controller for the first respective task, by allowing the managed controller to execute the first respective task in the primary mode and allowing the first peer controller to execute the first respective task in a secondary mode, and by sending an activity message to the first peer controller until the managed controller becomes nonavailable;

a second module that enables the managed controller to provide redundancy to a second peer controller that executes a second respective task in the primary mode by identifying the second peer controller, by allowing the managed controller to execute the second respective task in the secondary mode and verifying that the second peer controller executes the second respective task in the primary mode, by receiving an activity message from the second peer controller, and in case that receiving is interrupted, by instantiating the second respective task for execution by the managed controller in the primary mode.

* * * * *